: US 7,092,267 B2
(45) Date of Patent: Aug. 15, 2006

(54) AUXILIARY POWER GENERATION IN A MOTOR TRANSFORMER

(75) Inventors: Douglas S. Carlson, Hawthorne, CA (US); John S. Hsu, Oak Ridge, TN (US); James M. Nagashima, Cerritos, CA (US); Constantin C. Stancu, Anaheim, CA (US); Donald J. Adams, Knoxville, TN (US); Gui-Jia Su, Knoxville, TN (US); Gregory S. Smith, Woodland Hills, CA (US)

(73) Assignee: General Motors Corporation, Detroit, MI (US)

( * ) Notice: Subject to any disclaimer, the term of this patent is extended or adjusted under 35 U.S.C. 154(b) by 103 days.

(21) Appl. No.: 10/664,297

(22) Filed: Sep. 17, 2003

(65) Prior Publication Data

US 2005/0057948 A1 Mar. 17, 2005

(51) Int. Cl.
*H02M 7/757* (2006.01)
(52) U.S. Cl. .............................. 363/79; 363/71; 318/139
(58) Field of Classification Search ................ 363/131, 363/132, 64, 41, 37, 53, 43, 92; 318/448, 318/811, 767, 768, 813, 729
See application file for complete search history.

(56) References Cited

U.S. PATENT DOCUMENTS

| 5,057,808 | A | * | 10/1991 | Dhyanchand | ................. | 336/12 |
| 5,341,075 | A | * | 8/1994 | Cocconi | ...................... | 318/139 |
| 5,537,307 | A | * | 7/1996 | Hirose et al. | ................. | 363/79 |
| 6,812,667 | B1 | * | 11/2004 | Yasohara et al. | ........... | 318/599 |

* cited by examiner

*Primary Examiner*—Rajnikant B. Patel
(74) *Attorney, Agent, or Firm*—Christopher DeVries

(57) ABSTRACT

A power supply generates alternating current and direct current from a constant-voltage source. A multi-phase pulse width modulation voltage source inverter is connected across the source to output multi-phase alternating current. At least one waveform generator is bridged in parallel with the inverter, with each waveform generator outputting zero-sequence waveform current compensated to maintain the multi-phase current within a predetermined tolerance from a desired set point. A rectifier receives the waveform current and generates direct current.

23 Claims, 4 Drawing Sheets

AUXILIARY POWER GENERATION IN A MOTOR TRANSFORMER

FIELD OF THE INVENTION

The present invention relates to power supplies, and more particularly to power supplies for vehicles.

BACKGROUND OF THE INVENTION

Vehicles may require a voltage source that provides a regulated voltage such as 12 VDC and/or 48 VDC. Internal combustion engine (ICE) vehicles use alternators that generate AC voltage, which is rectified to DC voltage. When the ICE is either operated intermittently (in a hybrid vehicle) or is absent (in a fuel cell or battery powered vehicle), an alternator can no longer be used to generate auxiliary DC power. DC power from a battery or fuel cell is the normal source of power for electric traction motors in such vehicles. DC/DC converters that are supplied by a high voltage DC bus are typically used to provide auxiliary power at a lower voltage level.

The reliability of DC/DC converters supplied by the high voltage bus needs to improve for automotive applications. DC/DC converters are also relatively expensive, especially when structurally enhanced to meet the tougher automotive applications.

SUMMARY OF THE INVENTION

Accordingly, the present invention provides a power supply that generates low voltage direct current (DC) from a high voltage DC voltage source. The power supply includes an inverter that supplies multi-phase current to a traction motor. A controller determines an adjusted first phase current based in part on the measured first phase current and determines an adjusted second phase current based in part on the measured second phase current. The controller calculates an available current based on the first and second adjusted phase currents and generates a voltage control PWM signal based on the available current.

In one feature, the power supply further includes a first auxiliary transformer supplied with a first auxiliary current from the inverter and having a first voltage output and a second auxiliary transformer supplied with a second auxiliary current from the inverter and having a second voltage output. The controller determines the first and second adjusted phase currents based on the first and second auxiliary currents.

In another feature, the controller controls the inverter based on the voltage control signal.

In another feature, the adjusted first phase current is determined by subtracting a first phase magnetizing current and a total auxiliary current from the measured first phase current. The first magnetizing current is determined based on the first phase voltage and frequency.

In still another feature, the adjusted second phase current is determined by subtracting a second phase magnetizing current and a total auxiliary current from the measured second phase current. The second magnetizing current is determined based on the second phase voltage and frequency.

In yet another feature, the inverter includes a first phase half bridge connected across the DC voltage source to provide the first phase current. A second phase half bridge is connected across the DC voltage source to provide the second phase current. A third phase half bridge connected across the DC voltage source to provide a third phase current to the traction motor. The inverter further includes a first auxiliary half bridge connected across the DC voltage source to provide a first auxiliary current and a second auxiliary half bridge connected across the DC voltage source to provide a second auxiliary current.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
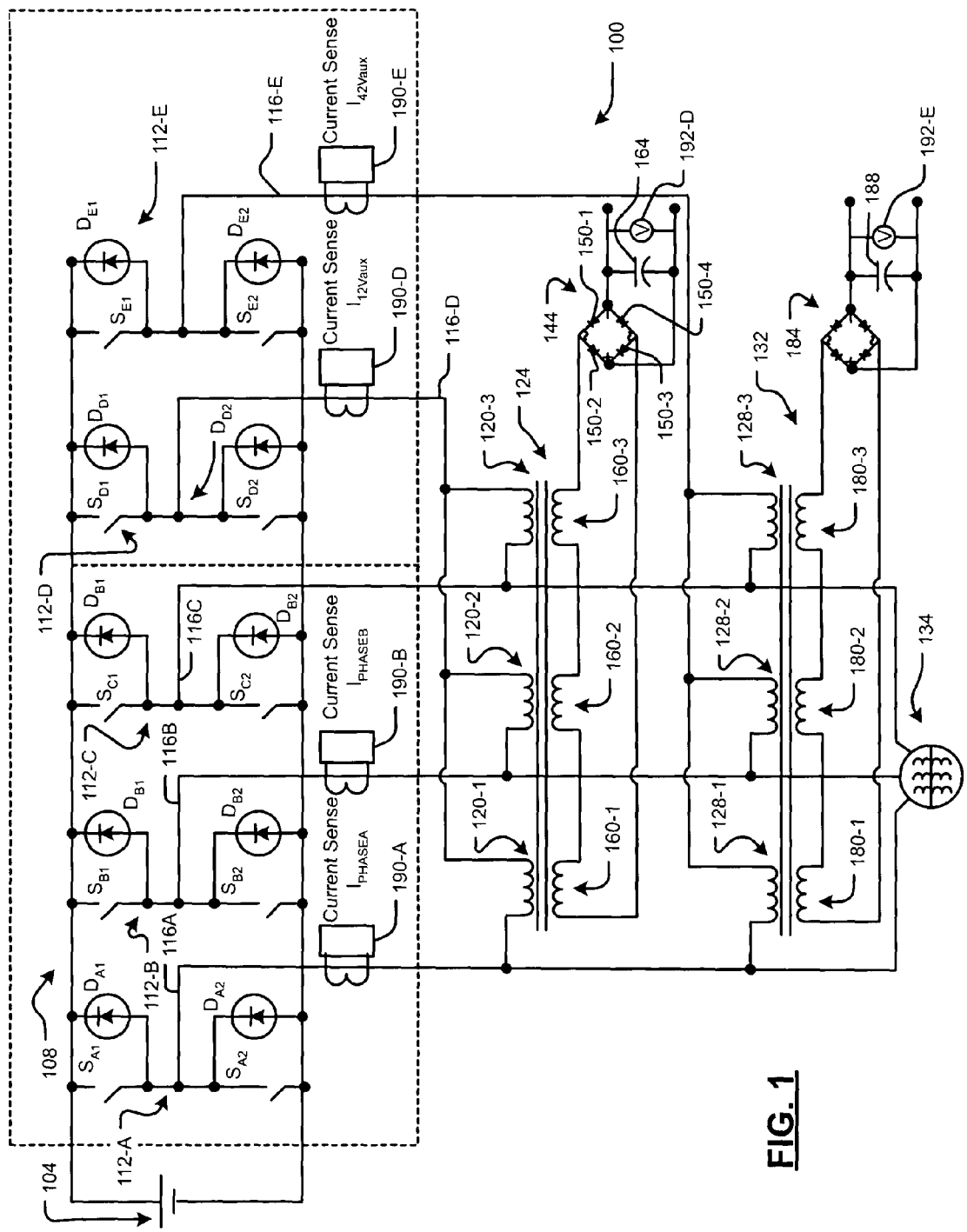
FIG. 1 is an electrical schematic of a power supply with 2 dual-switch auxiliary power half-bridges according to the present invention.

The following description of the preferred embodiment is merely exemplary in nature and is in no way intended to limit the invention, its application, or uses. For purposes of clarity, the same reference numbers will be used in the drawings to identify similar elements.

In overview, the power system according to the present invention produces AC power for an electric traction motor as well as auxiliary low voltage DC power. DC power is preferably output at a first voltage level such as 12 volts nominal and also at a second voltage level such as 42 volts nominal. A three-phase inverter generates power that is output to traction motor windings. One half-bridge is added to the three-phase traction inverter for each auxiliary voltage level that is produced. A controller operates the inverter and auxiliary bridge(s) to ensure that traction power demand takes precedence over auxiliary power demand. Accordingly, the controller limits the auxiliary power so as to maintain the multi-phase AC current to the traction motor within a predetermined tolerance.

The controller includes a traction inverter control module that calculates an available current signal, which is output to an auxiliary voltage control module. Available current is defined as the difference between the maximum safe current of a traction inverter switch and the measured value of a traction phase current. The auxiliary voltage control module adjusts an output thereof to maintain an auxiliary current less than the available current signal.

Figure 2:
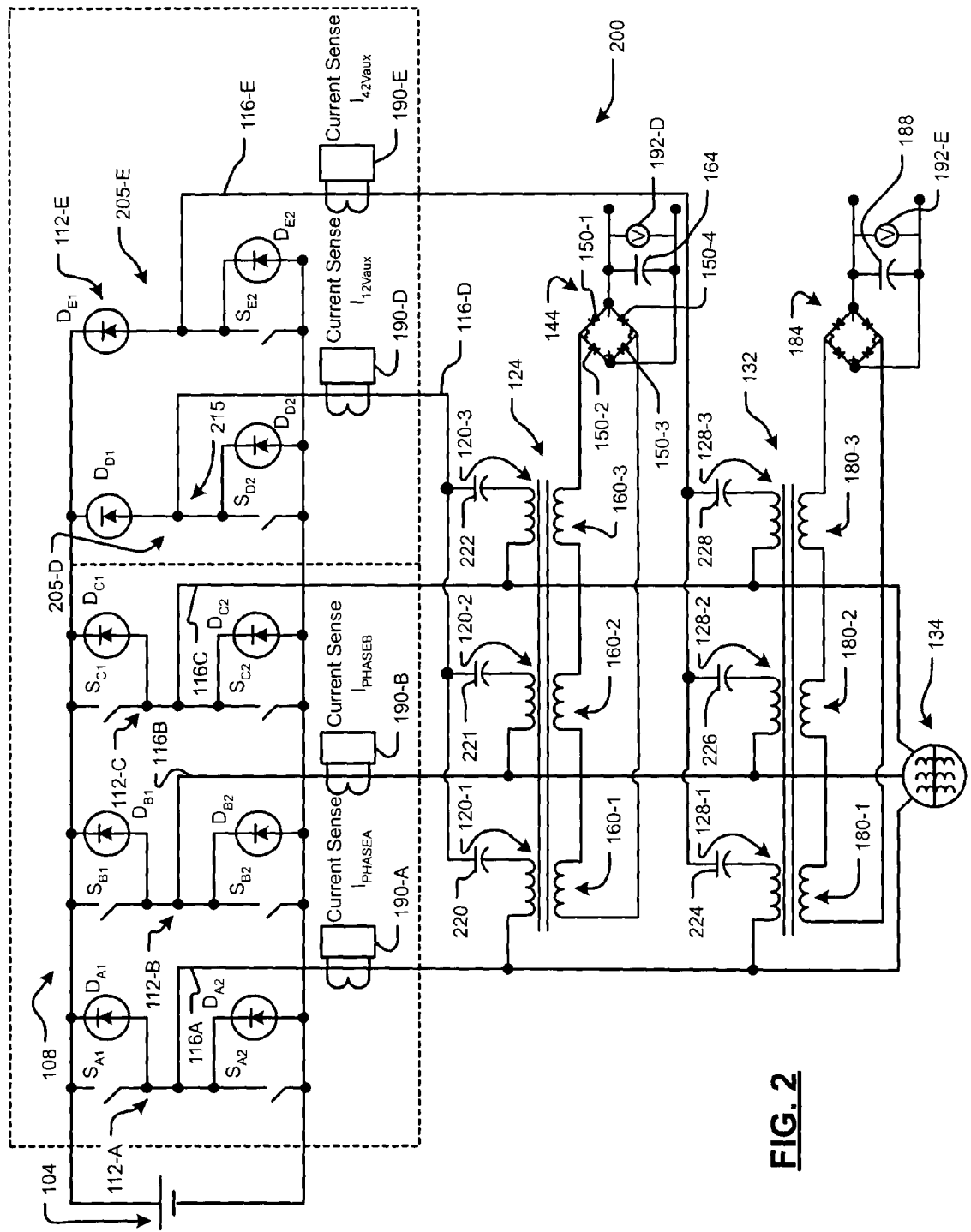
FIG. 2 is an electrical schematic of an exemplary configuration of the power supply with 2 single-switch auxiliary power half-bridges according to the present invention.
Figure 3:
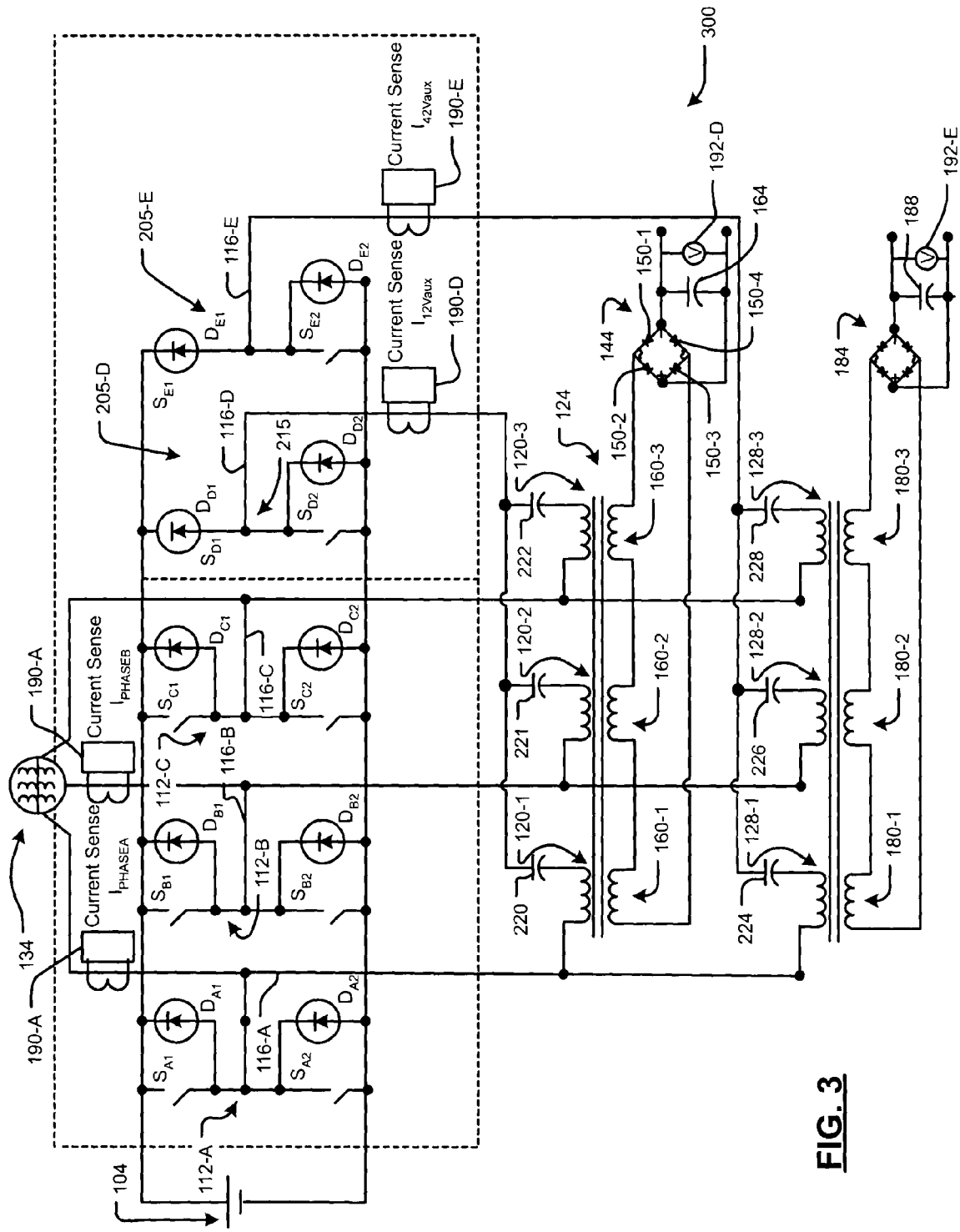
FIG. 3 is an electrical schematic of an alternate configuration of the power supply with 2 single-switch auxiliary power half-bridges according to the present invention.

Three alternative power conversion systems are shown in FIGS. 1 through 3. A controller, further described in the discussion of FIG. 4, measures one or more parameters and operates the power conversion systems. Referring now to FIG. 1, a power supply 100 includes a DC voltage source 104 and a 3-phase inverter 108. First, second and third primary half-bridges 112-A, 112-B and 112-C of the inverter 108 are associated with phases A, B, and C. The half-bridges 112-A, 112-B and 112-C include first and second switches SA1 and SA2, SB1 and SB2, and SC1 and SC2, respectively, that are connected across the voltage source 104. The switches SA1, SA2, SB1, SB2, SC1 and SC2 are also connected in anti parallel with diodes DA1, DA2, DB1, DB2, DC1 and DC2, respectively.

Output conductors 116A, 116B and 116C have one end that is connected between the switches SA1, SA2, SB1, SB2, SC1 and SC2, respectively. Opposite ends of the conductors 116A, 116B, 116C are connected to first ends of first, second and third primary windings 120-1, 120-2, and 120-3 of a first transformer 124. Opposite ends of the conductors 116A, 116B, 116C are also connected to first ends of first, second and third primary windings 128-1, 128-2, and 128-3 of a second transformer 132 and to windings of a traction motor 134. First and second auxiliary half-bridges 112-D and 112-E also include switches SD1, SD2, SE1 and SE2, respectively, that are connected across the voltage source 104. The switches SD1, SD2, SE1 and SE2 are also connected in anti parallel with diodes DD1, DD2, DE1 and DE2, respectively. The first and second auxiliary half-bridges 112-D and 112-E are associated with the generation of first and second auxiliary voltage levels, as will be described further below.

Output conductor 116-D has one end that is connected between the switches SD1 and SD2. An opposite end of the conductor 116-D is connected to second ends of the first, second and third primary windings 120-1, 120-2, and 120-3 of the first transformer 124. Output conductor 116-E has one end that is connected between the switches SE1 and SE2. An opposite end of the conductor 116-E is connected to second ends of the first, second and third primary windings 128-1, 128-2, and 128-3, respectively, of the second transformer 132.

A rectifier 144 includes first, second, third and fourth diodes 150-1, 150-2, 150-3 and 150-4, respectively. The anode of diode 150-2 is connected to the cathode of diode 150-1. The anode of diode 150-3 is connected to the cathode of diode 150-4. The anode of diode 150-4 is connected to the anode of diode 150-1. The cathode of diode 150-2 is connected to the cathode of diode 150-3.

Secondary windings 160-1, 160-2 and 160-3 of the first transformer 124 are connected in series. One end of the third secondary winding 160-3 is connected to the cathode of diode 150-1 of the rectifier 144. One end of the first secondary winding 160-1 is connected to the anode of the diode 150-3 of the rectifier 144. A capacitor 164 has one end that is connected to the anode of diode 150-4 and an opposite end that is connected to the cathode of diode 150-3. In a similar manner, secondary windings 180-1, 180-2 and 180-3 of the second transformer 132 are connected to a rectifier 184 and a capacitor 188. Current sensors 190-A, 190-B, 190-D and 190-E sense current flowing through the conductors 116-A, 116-B, 116-D and 116-E. Voltage sensor 192-D senses voltage across capacitor 164 and voltage sensor 192-E senses voltage across capacitor 188.

In one embodiment, the transformers 124 and 132 are integrated into corners of traction motor 134. In an alternative embodiment, the transformers 124 and 132 are free standing. In one embodiment, magnetics associated with each power converter are located in corners of the traction motor stator. In this regard, laminations are cut in a square configuration instead of in a traditional circular configuration.

Windings of the traction motor 134 respond to plus and minus sequence voltage from inverter 108. Windings of the traction motor 134 preferably do not respond to zero-sequence waveform voltages from half-bridges 112-D and 112-E in conductors 116-D and 116-E. Series-connected secondary windings of each of three-phase auxiliary power transformers 124 and 132 do not produce an output in response to the plus- and minus-sequences of the inverter 108. These secondary windings do produce an output in response to the zero-sequence waveform voltages that are generated from auxiliary half-bridges 112-D and 112-E.

A positive or negative sequence sine wave output from traction inverter 108 produces torque in traction motor 134. Zero sequence sine wave waveform current from each auxiliary half-bridge 112-E and 112-D produce a corresponding DC auxiliary voltage at the output of rectifiers 144 and 184. Current sensors 190-D and 190-E measure currents from corresponding auxiliary half-bridges 112-D and 112-E. A controller bases control commands on the measured currents as described in further detail below in conjunction with FIG. 4.

As previously noted, the auxiliary half-bridges 112-D and 112-E include switches SD1, SD2, SE1 and SE2, respectively, with anti-parallel free-wheeling diodes DD1, DD2, DE1 and DE2, respectively. Alternatively, if the output of the auxiliary half-bridge is capacitor coupled, the upper leg of the auxiliary half-bridge only needs the free-wheeling diode and not the switch. This arrangement is shown in both FIGS. 2 and 3.

Referring now to FIG. 2, a power supply 200 having single-switch auxiliary power half-bridges is shown. Many elements of power supply 200 are the same as those of the power supply 100 in FIG. 1. However, the elements of the auxiliary half-bridges providing current to secondary windings of transformers 124 and 132 are different between power supply 200 and power supply 100.

Power supply 200 replaces each half-bridge 116-D and 116-E of circuit 100 with half-bridges 205-D and 205-E. Half-bridge 205-D has a diode DD1 and a diode DD2 connected in series across the voltage source 104. A switch SD2 is connected in parallel to diode DD2. The half-bridge 205-E likewise includes diodes DE1 and DE2 and a switch SE2 that are arranged in a similar manner. The half-bridge 205-D is connected to one end of capacitors 220, 221, and 222. Opposite ends of the capacitors 220, 221 and 222 are connected to the primary windings 120-1, 120-2 and 120-3, respectively. The half-bridge 205-E is connected to the end of capacitors 224, 226, and 228. Opposite ends of the capacitors 224, 226 and 228 are connected to the primary windings 128-1, 128-2 and 128-3 of the transformer 132.

FIG. 3 shows an alternate connection for the traction motor 134 in a power supply 300. The power supply 300 includes many elements from the power supply 200. The differences between the power supply 200 and the power supply 300 are in the relative positioning of inverter 108, auxiliary transformers 124 and 132, sensors 190-A and 190-B, and motor 134. The power supply 200 (FIG. 2) connects auxiliary transformers 124 and 132 and motor 134 to power phases 116-A and 116-B and 116-C through sensors 190-A and 190-B. The power supply 300 (FIG. 3) connects the power phases 116-A, 116-B and 116-C of inverter 108 between auxiliary transformers 124 and 132 and motor 134. The power supply 300 positions sensors 190-A and 190-B between inverter 108 and motor 134. The impact of these differences will be further discussed in conjunction with the control module of FIG. 4.

Current sensors 190-A and 190-B generate measured phase currents IPHASEA and IPHASEB for phases A and B, respectively. Current sensors 190-D and 190-E generate zero-sequence waveform currents I12Vaux and I42Vaux that are produced by the zero-sequence waveform voltage from the auxiliary bridges 112-D, 112-E, respectively. The voltage sensors 192-D and 192-E generate voltage signals V12VAUX and V42VAUX that indicate the voltages supplied by the auxiliary transformers 124 and 132, respectively. Voltage signals VAPPLIEDA and VAPPLIEDB indicate the commanded positive or negative sequence voltage applied to the traction motor for phases A and B, respectively. VAPPLIEDA and VAPPLIEDB also indicate the commanded positive or negative sequence voltage applied through the auxiliary transformers 124,132.

For the power supplies 100, 200 and 300 discussed above, there are two components of current flowing in the transformer primary. A first current component includes a magnetizing current that results from the positive and negative sequence voltage. A second current component includes a reflected load current produced by the zero sequence voltage.

If the auxiliary transformers 124, 132 are connected after the traction current sensors, as is the case for the power supplies 100, 200 of FIGS. 1 and 2, respectively, the magnetizing current is sensed by the current sensors 190-A and 190-B. The magnetizing current represents an error in IPHASEA and IPHASEB and must be subtracted out to maintain accurate control of the traction current. The magnetizing current, however, is not sensed by the current sensors 190-D, 190-E. Therefore, the magnetizing current IMAGA and IMAGB for phases A and B, respectively, are estimated. IMAGA and IMAGB are estimated based on the following equations:

$$I_{MAGA} = \frac{V_{APPLIEDA}}{2\pi f}$$

$$I_{MAGB} = \frac{V_{APPLIEDB}}{2\pi f}$$

where f is the voltage frequency.

Because all 3 secondary windings of each of the auxiliary transformers 124, 132 are in series, I12Vaux and I42Vaux also flow through the respective primary windings of the auxiliary transformer 124, 132. As a result, I12Vaux and I42Vaux are also subtracted from IPHASEA and IPHASEB. Subtracting I12Vaux, I42Vaux, IMAGA and IMAGB provides adjusted currents IADJA and IADJB for phases A and B, respectively.

Figure 4:
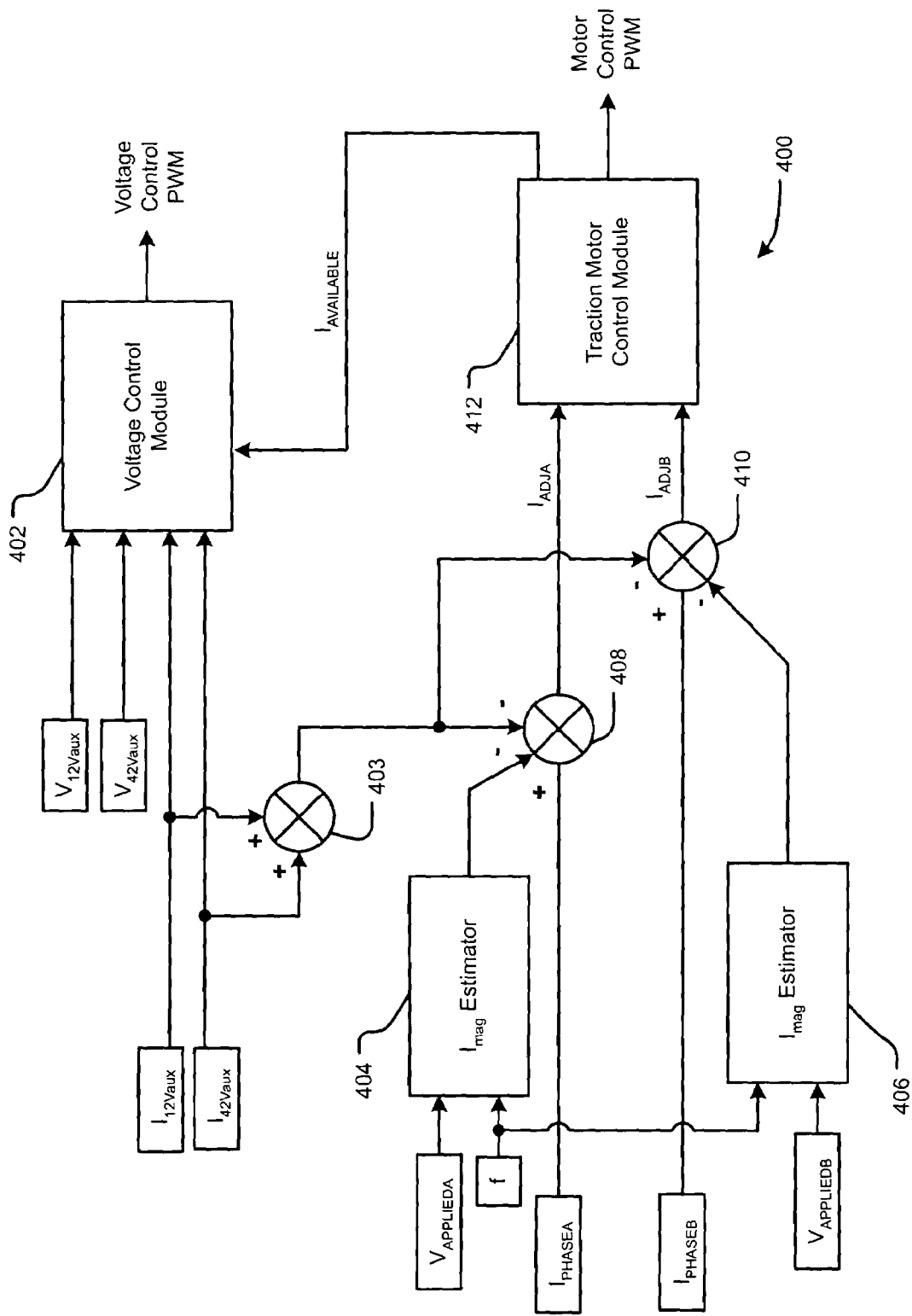
FIG. 4 is a functional block diagram of a controller for the electrical circuits of FIGS. 1–3.

Referring now to FIG. 4, a control system 400 is illustrated and defines the control logic for the power supplies 100 and 200 (i.e., where the auxiliary transformers 124, 132 are connected after the traction current sensors 190-A, 190-B). The current sensors 190-A, 190-B, 190-D, and 190-E, voltage sensors 192-D and 192-E, and switches of the power supply circuits 100, 200, 300 are connected to the control system 400. The control system 400 receives current signals and voltage signals from the connected power supply circuit and controls the switches SA1, SA2, SB1, SB2, SC1, SC2, SD1, SD2, SE1, and SE2.

The signals f, V12VAUX, V42VAUX, VAPPLIEDA, VAPPLIEDB, IPHASEA, IPHASEB, I12Vaux and I42Vaux are inputs to the control system 400. V12VAUX, V42VAUX, I12Vaux and I42Vaux are input to a voltage control module 402. The voltage control module 402 determines a pulse-width modulated (PWM) voltage control signal based on V12VAUX, V42VAUX, I12Vaux and I42Vaux and an available current signal IAVAILABLE to control the voltage of the auxiliary transformers 124, 132. IAVAILABLE is the difference between the maximum current that the traction inverter switches can handle (a predetermined set point) and the measured value of the traction phase currents. The voltage control module 402 maintains the auxiliary current less than IAVAILABLE. I12Vaux and I42Vaux are summed by a summer 403 to provide a total auxiliary current IAUX.

VAPPLIEDA, VAPPLIEDB and f are input to magnetizing current estimators 404 and 406. More specifically, the current estimator 404 determines IMAGA based on VAPPLIEDA and f as described above. Similarly, the current estimator 406 determines IMAGB based on VAPPLIEDB and f. IMAGA and IAUX are inverted and summed with IPHASEA by a summer 408 to provide an adjusted phase current IADJA. In effect, IMAGA and IAUX are subtracted from IPHASEA. Similarly, IMAGB and IAUX are inverted and summed with IPHASEB by a summer 410 to effectively subtract IMAGA and IAUX from IPHASEA to provide IADJB.

IADJA and IADJB are sent to a traction motor control module 412. The traction motor control module 412 represents a typical AC control system such as a field oriented system. The traction motor control module 412 determines a PWM motor control signal based on IADJA and IADJB. The traction motor 134 is operated based on the PWM motor control signal. Traction power demand takes precedence over auxiliary power demand. To accomplish this, the traction motor control module 412 determines IAVAILABLE based on IADJA and IADJB. IAVAILABLE is input to the voltage control module, which limits the PWM voltage control signal such that the auxiliary power current is less than IAVAILABLE, as discussed above.

If the auxiliary transformers 124, 132 are connected before the traction current sensors 190-A, 190-B, as is the case for the power supplies 300 of FIG. 3, IMAGA, IMAGB and IAUX need not be subtracted from IPHASEA and IPHASEB, respectively. In this case, IPHASEA and IPHASEB are input directly to the traction motor control module 412, which determines the PWM motor control signal and IAVAILABLE based thereon.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

The invention claimed is:

1. A power supply that generates alternating current (AC) and direct current (DC) from a DC voltage source, comprising:
   an inverter that supplies a first phase current and a second phase current to a traction motor, wherein said inverter comprises:
   a first phase half bridQe connected across said DC voltage source to provide said first phase current;
   a second phase half bridge connected across said DC voltage source to provide said first phase current;
   a third chase half bridge connected across said DC voltage source to provide a third phase current to said traction motor;

a first auxiliary half bridge connected across said DC voltage source to provide a first auxiliary current; and a second auxiliary half bridge connected across said DC voltage source to provide a second auxiliary current; and a controller that determines a first adjusted phase current based on said first phase current, determines a second adjusted phase current based on said second phase current, calculates an available current based on said first and second adjusted phase currents and generates a voltage control signal based on said available current, wherein said controller controls said inverter based on said voltage control signal.

2. The power supply of claim 1 further comprising:

a first auxiliary transformer supplied with a first auxiliary current from said inverter and having a first voltage output;

a second auxiliary transformer supplied with a second auxiliary current from said inverter and having a second voltage output; and wherein said controller determines said first and second adjusted phase currents based on said first and second auxiliary currents.

3. The power supply of claim 1 wherein said first adjusted phase current is determined by subtracting a first phase magnetized current and a total auxiliary current from said first phase current.

4. The power supply of claim 3 wherein said first magnetized current is determined based on a first phase voltage and a frequency.

5. The power supply of claim 1 wherein said second adjusted phase current is determined by subtracting a second phase magnetized current and a total auxiliary current from said second phase current.

6. The power supply of claim 5 wherein said second magnetized current is determined based on a second phase voltage and a frequency.

7. A method of controlling an alternating current (AC) and direct current (DC) power supply, comprising:

determining a first adjusted phase current for a first phase current supplied to a traction motor;

determining a second adjusted phase current for a second phase current supplied to said traction motor;

calculating an available current based on said first and second adjusted phase currents;

generating a voltage control signal based on said available current; and controlling said AC and DC power supply based on said voltage control signal.

8. The method of claim 7 wherein said step of determining a first adjusted phase current comprises subtracting a first phase magnetized current and a total auxiliary current from said first phase current.

9. The method of claim 8 wherein said first magnetized current is determined based on a first phase voltage and a frequency.

10. The method of claim 7 wherein said step of determining a second adjusted phase current comprises subtracting a second phase magnetized current and a total auxiliary current from said second phase current.

11. The method of claim 10 wherein said second magnetized current is determined based on a second phase voltage and a frequency.

12. The method of claim 7 wherein said first adjusted phase current is equivalent to said first phase current.

13. The method of claim 7 wherein said second adjusted phase current is equivalent to said second phase current.

14. The method of claim 7 further comprising:

generating a first auxiliary voltage signal;

generating a first auxiliary current signal; and determining said voltage control signal based on said first auxiliary voltage signal, said first auxiliary current signal and said available current signal.

15. The method of claim 14 further comprising:

generating a second auxiliary voltage signal;

generating a second auxiliary current signal; and determining said voltage control signal based on said second auxiliary voltage signal, said second auxiliary current signal and said available current signal.

16. A method of regulating an alternating current (AC) and direct current (DC) power supply having a DC source, an inverter and first and second auxiliary transformers, comprising:

determining a first adjusted phase current for a first phase current supplied from said inverter to a traction motor by subtracting a first phase magnetized current and a total auxiliary current from said first phase current;

determining a second adjusted phase current for a second phase current supplied from said inverter to said traction motor;

calculating an available current based on said first and second adjusted phase currents;

generating a voltage control signal based on said available current; and controlling said inverter based on said voltage control signal to adjust DC voltage outputs of said first and second auxiliary transformers.

17. The method of claim 16 wherein said first magnetized current is determined based on a first phase voltage and a frequency.

18. The method of claim 16 wherein said step of determining a second adjusted phase current comprises subtracting a second phase magnetized current and a total auxiliary current from said second phase current.

19. The method of claim 18 wherein said second magnetized current is determined based on a second phase voltage and a frequency.

20. The method of claim 16 wherein said first adjusted phase current is equivalent to said first phase current.

21. The method of claim 16 wherein said second adjusted phase current is equivalent to said second phase current.

22. The method of claim 16 further comprising:

generating a first auxiliary voltage signal;

generating a first auxiliary current signal; and determining said voltage control signal based on said first auxiliary voltage signal, said first auxiliary current signal and said available current signal.

23. The method of claim 22 further comprising:

generating a second auxiliary voltage signal;

generating a second auxiliary current signal; and determining said voltage control signal based on said second auxiliary voltage signal, said second auxiliary current signal and said available current signal.

* * * * *